United States Patent
Parkinson

(10) Patent No.: US 8,127,175 B2
(45) Date of Patent: Feb. 28, 2012

(54) HIGH AVAILABILITY OF JCA INFLOWED TRANSACTIONS

(75) Inventor: Paul Parkinson, Wenonah, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 489 days.

(21) Appl. No.: 11/723,274

(22) Filed: Mar. 19, 2007

(65) Prior Publication Data

US 2008/0235295 A1    Sep. 25, 2008

(51) Int. Cl.
*G06F 11/00* (2006.01)
(52) U.S. Cl. .......................... 714/15; 714/4.11
(58) Field of Classification Search .................... 714/15, 714/16, 4.11
See application file for complete search history.

(56) References Cited

U.S. PATENT DOCUMENTS

| | | | |
|---|---|---|---|
| 7,730,489 B1 * | 6/2010 | Duvur et al. | 718/104 |
| 2003/0163755 A1 * | 8/2003 | Fung et al. | 714/4 |
| 2006/0075277 A1 * | 4/2006 | Johnson et al. | 714/4 |
| 2006/0253856 A1 * | 11/2006 | Hu et al. | 718/104 |

\* cited by examiner

*Primary Examiner* — Yolanda L Wilson
(74) *Attorney, Agent, or Firm* — Murphy & King, P.C.

(57) ABSTRACT

Recovery of inflowed transactions are provided by any instance in a cluster, along with peer recovery of transactions in a cluster, and administrative functionality related to these aspects. A method of managing transaction processing comprises performing transaction processing using a first process, wherein the first process logs the transaction processing that it performs, detecting failure of the first process, wherein the transaction logs of the first process are locked, taking ownership of the locked transaction logs of the first process at a second process, unlocking the locked transaction logs of the first process for use by the second process, and recovering at least one transaction using the transaction logs.

13 Claims, 10 Drawing Sheets

Fig. 2
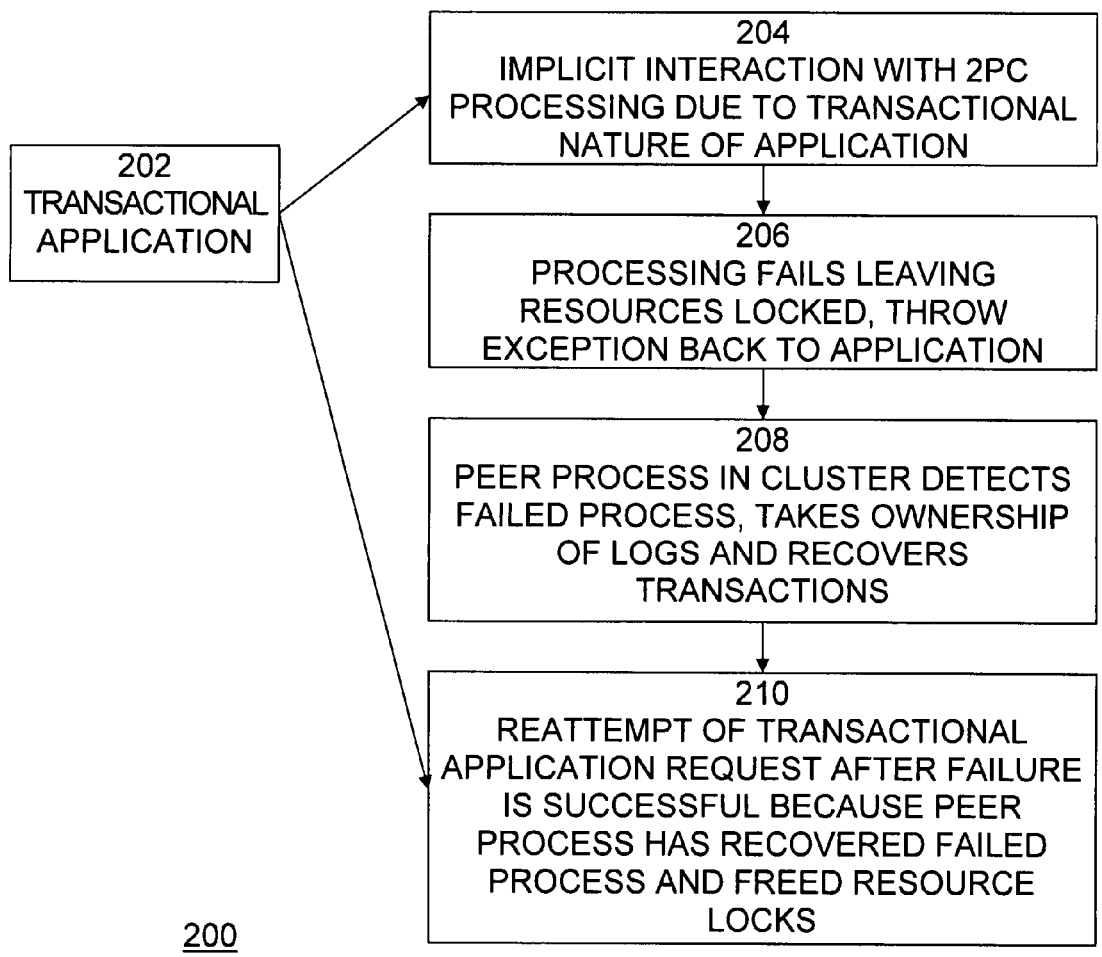
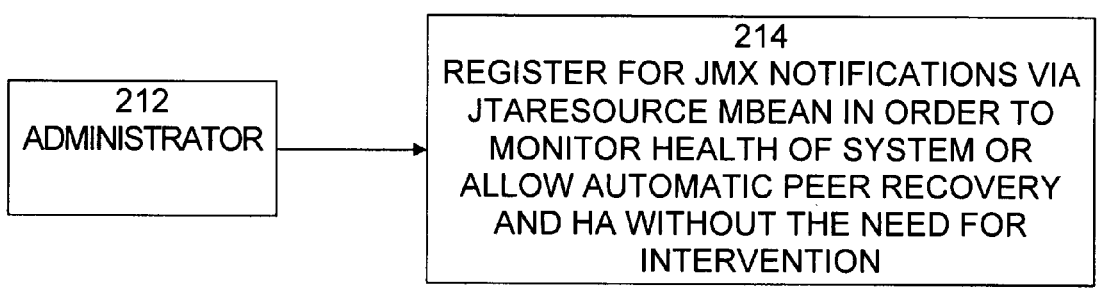

HIGH AVAILABILITY OF JCA INFLOWED TRANSACTIONS

BACKGROUND OF THE INVENTION

1. Field of the Invention

The present invention relates to providing the capability for peer processes in an application server cluster to detect failure of and recover transactions from any application server in the cluster.

2. Description of the Related Art

An application server is a process on a server computer on a computer network dedicated to running certain software applications (as opposed to, for example, a file server or print server). Generally, an application server is a software process that delivers applications to client computers. Moreover, an application server should handle most, if not all, of the business logic and data access of the application. Typically, multiple application servers are grouped into clusters of server computers. A computer cluster is a group of loosely coupled computers that work together closely so that in many respects they can be viewed as though they are a single computer. The components of a cluster are commonly, but not always, connected to each other through fast local area networks. Clusters are usually deployed to improve speed and/or reliability over that provided by a single computer, while typically being much more cost-effective than single computers of comparable speed or reliability.

Given that there are multiple computers in a server cluster, a need arises for high availability of Global/XA transactions. This entails the collaboration of a number of application server processes within the cluster to provide information on and timely recovery of such transactions. Problems that result from lack of such a capability include potential transactional inconsistencies due to lack of correct information as well as the prolonged holding of resource locks (such as databases) which present serious performance repercussions. One specific aspect of this high-availability is the need for enterprise information systems to be able to call any application server in the cluster and request information about or execute actions upon any transaction in the cluster.

Thus, a need arises for a technique that provides improved availability of Global/XA transactions in an application server cluster.

SUMMARY OF THE INVENTION

The present invention provides recovery of inflowed transactions by any instance in the cluster, peer recovery of transactions in a cluster, and administrative functionality related to these aspects.

A method of managing transaction processing comprises performing transaction processing using a first process, wherein the first process logs the transaction processing that it performs, detecting failure of the first process, wherein the transaction logs of the first process are locked, taking ownership of the locked transaction logs of the first process at a second process, unlocking the locked transaction logs of the first process for use by the second process, and recovering at least one transaction using the transaction logs. The transaction may be processed using a two-phase commit protocol. The first process and the second process may be transaction managers. The method may further comprise updating a parent process of the first process to use the second process instead of the first process. The method may further comprise taking ownership of other locked resources of the first process at a second process, unlocking the other locked resources of the first process for use by the second process, and recovering at least one transaction using the other resources.

BRIEF DESCRIPTION OF THE DRAWINGS

Further features and advantages of the invention can be ascertained from the following detailed description that is provided in connection with the drawings described below:

FIG. 2 is an exemplary flow diagram of a process of High Availability recovery of inflowed transactions.

DETAILED DESCRIPTION OF THE PREFERRED EMBODIMENTS

Figure 1:
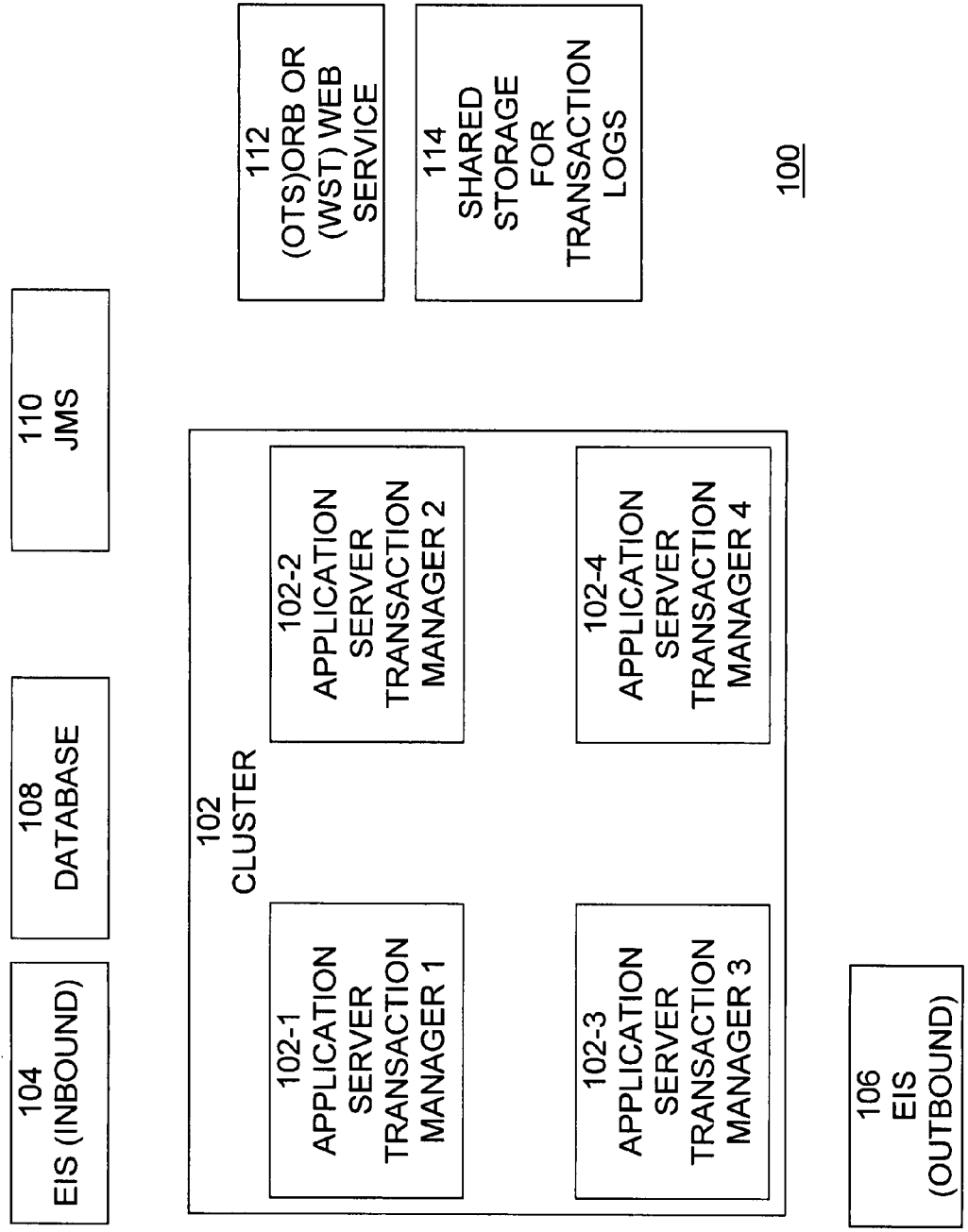
FIG. 1 is an exemplary block diagram of an application server cluster in which the present invention may be implemented.

High-availability clusters are implemented primarily for the purpose of improving the availability of services which the cluster provides. They operate by having redundant nodes, which are then used to provide service when system components fail. The minimum size for an HA cluster is two nodes, which is the minimum requirement to provide redundancy. HA cluster implementations attempt to manage the redundancy inherent in a cluster to eliminate single points of failure.

In computing, Java EE Connector Architecture (JCA) is a Java-based technology solution for connecting application servers and enterprise information systems (EIS) as part of enterprise application integration (EAI) solutions. While JDBC is specifically used to connect Java EE applications to databases, JCA is a more generic architecture for connection to legacy systems (including databases). One common example of an implementation of J2EE containers is called Oracle® Containers for J2EE which is abbreviated as OC4J. OC4J includes the following servers—Web Container, Enterprise Java Beans (EJB) Container, and JMS Server. Although the present invention is described in the context of an OC4J implementation, it is not limited to such an implementation. Rather the present invention contemplates implementation within any application server architecture.

In order to provide a high-availability of Global/XA transactions within a cluster, the collaboration of processes within the cluster to is needed to provide information on and timely recovery of such transactions.

One aspect of the present invention is recovery of inflowed transactions by any OC4J process in a cluster. An OC4J process may act as an interposed Transaction Manager (TM) in a global transaction propagated (and in the common case initiated) from an Enterprise Information System (EIS). A TM manages the transaction processing, which is designed to maintain a database in a known, consistent state, by ensuring that any operations carried out on the database that are interdependent are either all completed successfully or all cancelled successfully. This transaction processing is information processing that is divided into individual, indivisible operations, called transactions. The TM ensures that each transaction must succeed or fail as a complete unit; it cannot remain in an intermediate state. Typically, this is done using the two-phase commit processing protocol. The two-phase commit protocol is a distributed algorithm which lets all nodes in a distributed system agree to commit a transaction. The protocol results in either all nodes committing the transaction or aborting, even in the case of network failures or node failures.

In the event of such a failure during Two-phase commit (2PC) processing (such as a process crash) either on the EIS or OC4J side (network included), it is possible, particularly in the latter case, that recovery may be initiated by this parent EIS upon an OC4J process in the cluster other than the one that was used during the actual runtime. In the case where the EIS has crashed, the Transaction Terminator process (XATerminator) of this recovering process must locate all Xids across the cluster and/or the requested Transaction identifier (Xid) and also be able to resolve this Xid's transaction as instructed by the EIS. The overall concept is that the OC4J cluster (of Transaction Managers/Recovery Managers) should be exposed as one highly available TM.

An exemplary system 100, in which the present invention may be implemented, is shown in FIG. 1. System 100 includes Application Server cluster 102, which includes a plurality of Application Server Transaction Managers 102-1 to 102-4, a number of potential transaction participants, such as EIS (inbound 104, EIS and outbound communication 106, database 108, JMS 110, and ORB Transaction Service (OTS) or Web Transaction Service (WTS) 112, and shared storage location for transaction logging 114.

An exemplary flow diagram of a process 200 of High Availability recovery of inflowed transactions by any OC4J process in a cluster 102 is shown in FIG. 2. Process 200 begins with step 202, in which a transactional application processes transactions. In step 204, there is implicit interaction with Two-phase commit protocol processing due to the transactional nature of the application. In step 206, when an OC4J process fails during 2PC processing and/or it is impossible to start a new OC4J process on the machine it was running in a timely manner in order to recover its transaction logs, this leaves the resources that were being used to process the transaction locked by the now crashed process.

In step 208, a peer OC4J process in cluster 102 detects the failed process, takes ownership of the crashed process's logs and recover its transactions. In step 210, when transactional application 202 reattempts the request that failed, the request will be successfully executed because the peer process has recovered the failed process and freed the resource locks.

In the case where the crashed OC4J is an interposed TM/coordinator, this peer must also update any coordinators in the cluster in order to redirect them to the takeover peer, redirect the tree of processes according to this new graph construct, recover, release resources locks, etc.

The peer process can take over in these situations due the requirement that all OC4J processes in the highly-available cluster log their transaction records to a shared location, i.e. shared disk or common database. Additionally, other software (virtual directories, etc.) and hardware (replication, etc.) solutions might be employed to further the reliability.

1. Database Logging: Due to the various transactional locking mechanisms inherit in databases and the nature of the OC4J database store's current use of them, transfer of ownership becomes chiefly a matter of updating the instanceid field of the crashed OC4J process, remapping any parent OC4J instances records accordingly, and recovering the imported transactions.

2. File Logging: The imported transactions/logs should be migrated to the recovering peer rather than simply processed from the logging location of the crashed process in order to prevent conflict should the crashed process subsequently restart successfully. This also allows for a simpler locking process that is set at the logging directory level (the instance id for the file store) in order to be most performant.

In process 200, a system administrator 212 may control recovery processing by registering for JMX notifications in order to monitor the health of the system. Such registration may be performed, for example, via a JTAResource MBean.

Figure 3:
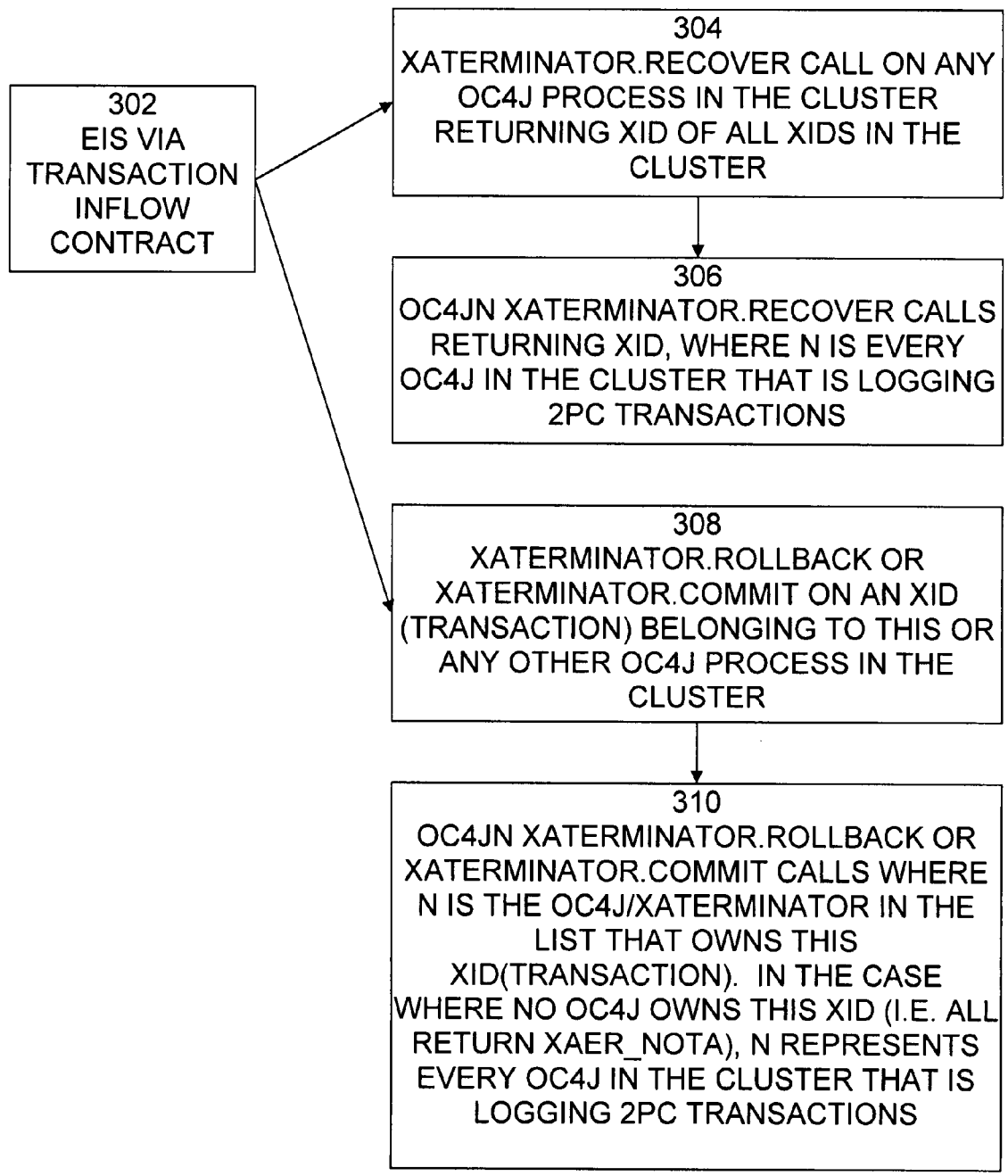
FIG. 3 is an exemplary flow diagram of an implementation of recovery of inflowed transactions.

An exemplary flow diagram of a process 300 by which recovery of inflowed transactions may be implemented is shown in FIG. 3. Process 300 begins with step 302, in which EIS transactions are imported via the JCA transaction inflow contract. In step 304, when a failure occurs during two-phase commit processing, such as a process crash, a hardware failure, or a network communications failure, JCA interface (the recover method of the XATerminator.) is called. All of the OC4J processes in the cluster are called to return all of the Xids of interposed TMs across the cluster. Step 304 includes step 306, in which every OC4J cluster that is logging two-phase commit transactions calls XATerminator.recover to return the Xids. This technique requires querying every node in the cluster and insuring that either all nodes in the cluster are active during/for the request, or, in the case that one or more nodes have crashed and have been unable to restart, that all of the logs/records belonging to the crashed process have been recovered by a peer. Failing this, it is necessary to know that not all logs are available and have the appropriate XAException (with errorcode of XAER_RMFAIL) thrown rather than an incomplete list returned.

Another scenario along these lines involves an OC4J process that does not crash, but is shutdown or restarting and has in-doubt records. In this case, a message must be sent from the OC4J that is shutting down to the rest of the cluster, informing each OC4J in the cluster that, until it is restarted or has received a message that a peer has recovered it, all instances must return a XAER_RMFAIL XAException error code for XATerminator.recover calls as well as a XAER_RMFAIL XAException error code from XATerminator.rollback/commit/forget calls if a XAER_NOTA XAException error code would have been returned otherwise. If this message is not successfully received by the entire cluster, a severe message must be logged to the debug and by natural course, it's unavailability will result in the correct XAER_RMFAIL being returned by the other OC4J members in the cluster that can not contact it. In the case where a message that a peer has recovered the files is received, an OC4J instance can update its server list accordingly thus removing the subscription of and reliance on the OC4J that was shutdown (of course if the previously crashed OC4J is restarted it rejoins the group and therefore server list).

In step 308, in the case where the Xid is found on an OC4J process in the cluster other than the one which was called upon initially, the method call will be issued upon the process that owns this record, rather than changing the ownership to the OC4J process/XATerminator which has received the initial request before issuing the command which is non-performant in the best case and dangerous in the worst. The XATerminator always looks locally first for the Xid in order to prevent network calls where possible, but even if it is found locally, in a cluster environment it must be determined that the Xid/node found is the root of the OC4J process/transaction tree lest (in the case where there are multiple OC4J nodes of this cluster in the transaction) not all branches be resolved consistently following the symantecs of checked transactions. Included in step 308 is step 310, in which an OC4J/XATerminator that owns a Xid calls XATerminator.rollback or XATerminator.commit on that Xid.

Alternatively to the log-type agnostic approach just described, an approach to exploit each log type's characteristics may be implemented:

1. Database Logging: If XATerminator.recover is called, in the case where the common database logging store is used, any OC4J process may query the database for all Xids in the cluster (the database store can not be shared across more than one cluster without modifications but this would likely be a very rare requirement) and so it is not required that all OC4J processes in a cluster be alive nor that any be contacted for the recover call. Also, there are no contention issues during this call. In the case where there are only a particular Xid is necessary (i.e. for recovery commit or rollback), the logging agnostic approach may still be used and may be preferable to a technique whereby ownership of a single record is changed/migrated.

2. File Logging: In this case the ability to know if all OC4J processes in a cluster are alive or have been recovered by a peer may be cheaper to determine due to the existence or non-existence of the appropriate log(dir)s. Due to various performance and resource issues associated with processing the entire cluster of file-based logs, however, the logging agnostic approach may well be the best alternative for file logging both for the XATerminator.recover and termination calls.

Figure 4:
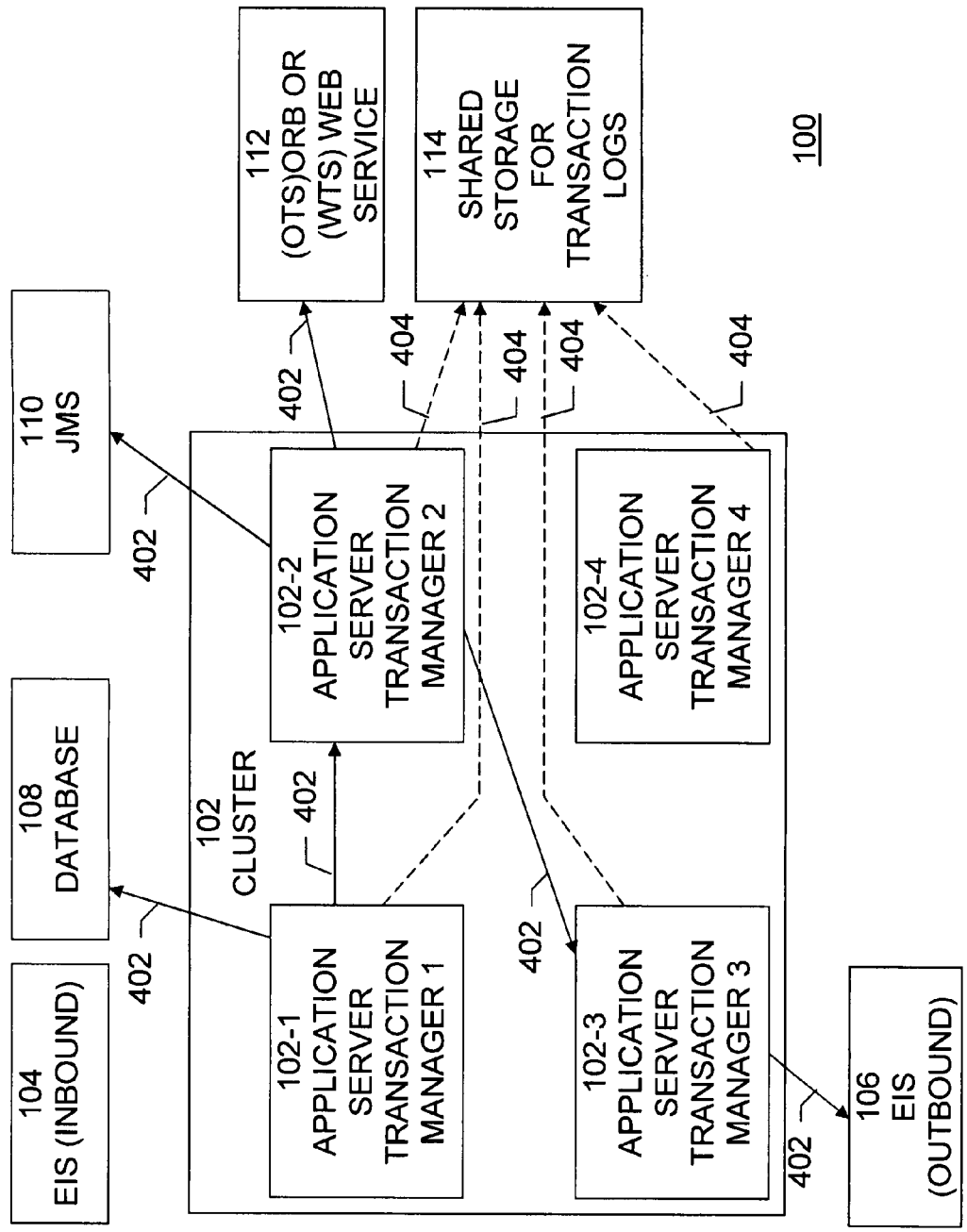
FIG. 4 illustrates an example of processing of a complex transaction in the system shown in FIG. 1.

An example of processing of a complex transaction is shown in FIG. 4. The transaction is initiated within Application Server Transaction Manager 102-1, which enlists a number of different resources and spans multiple Application Server Transaction Managers. The procedure call flow and therefore enlistment may occur in a number of combinations and there may be repeated calls between all nodes and resources within the context of the same transaction. For example, Application Server Transaction Manager 102-1 may enlist 402 database 108 and Application Server Transaction Manager 102-2, Application Server Transaction Manager 102-2 may enlist 402 JMS 110, OTS or WTS participants 112, and Application Server Transaction Manager 102-3, and Application Server Transaction Manager 102-3 may enlist an 402 EIS 106. Each Application Server Transaction Manager 102-1 to 102-4 logs 404 the transactions it has processed in the shared storage location for transaction logging 114.

Figure 5:
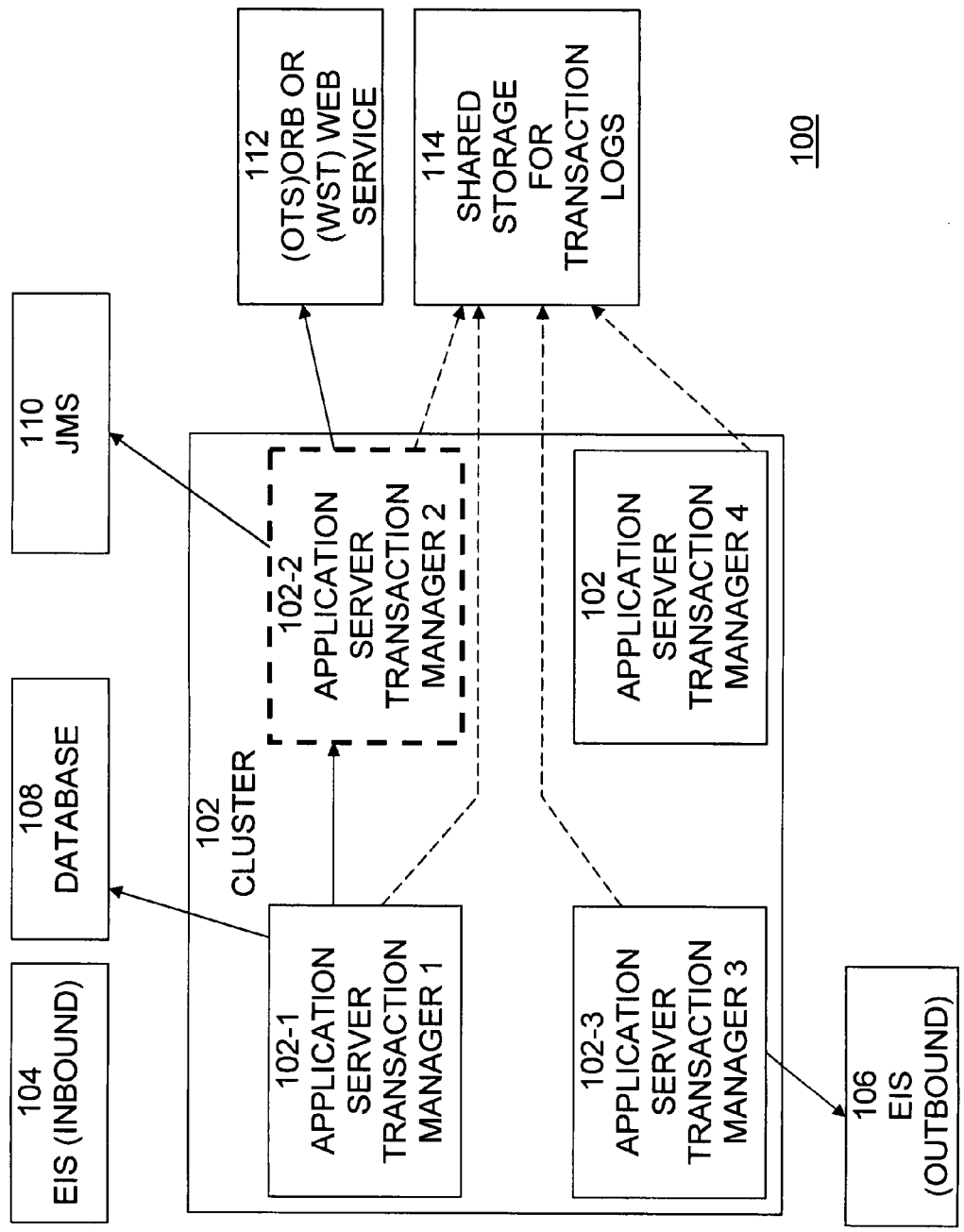
FIG. 5 illustrates an example of processing in which an Application Server Transaction Manager has crashed in the system shown in FIG. 1.
Figure 6:
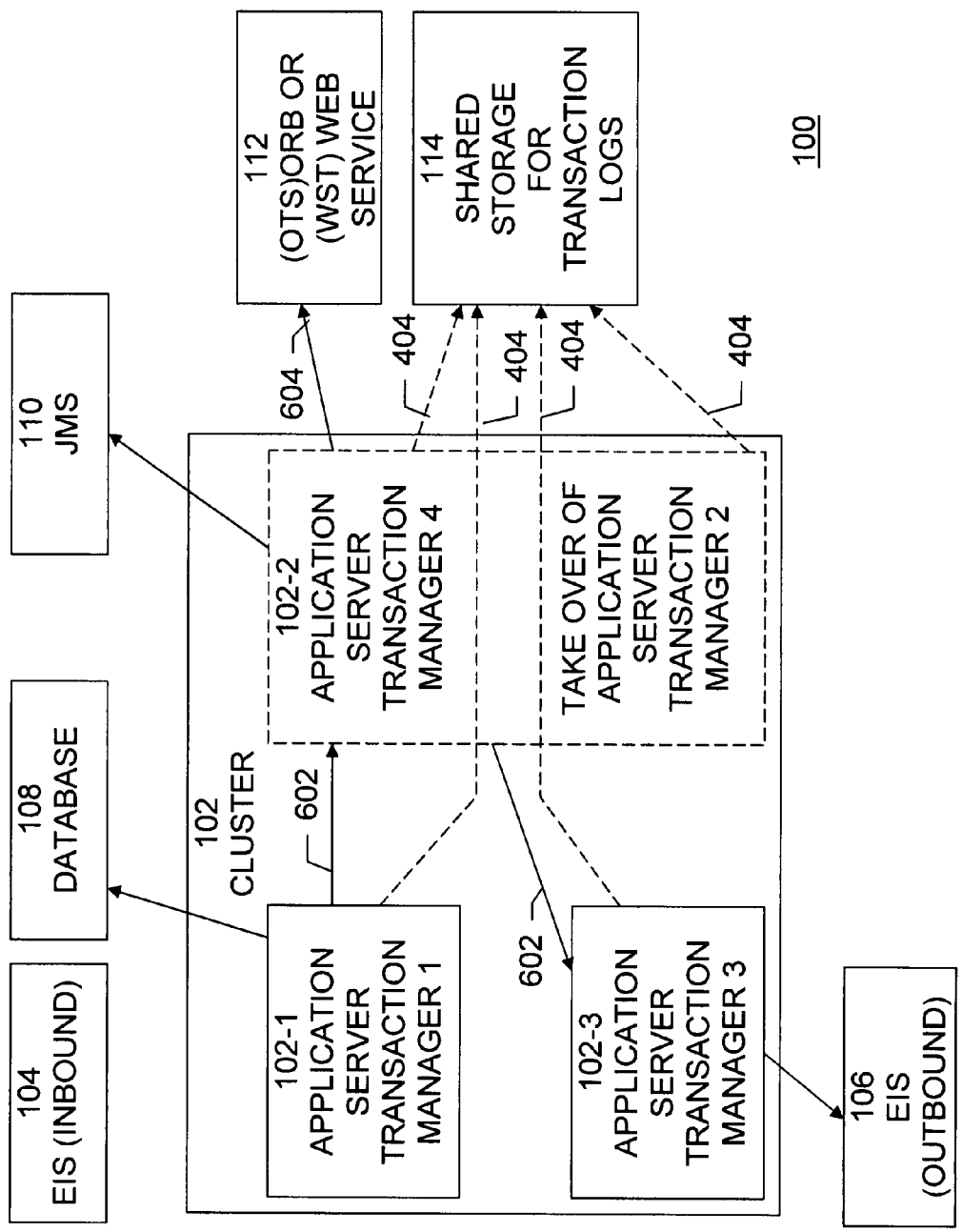
FIG. 6 illustrates an example of processing in which an Application Server Transaction Manager has crashed in the system shown in FIG. 1.

Examples of peer recovery are shown in FIGS. 5 and 6. An example of application processing flow in which an Application Server Transaction Manager has crashed is shown in FIG. 5. In this example, Application Server Transaction Manager 102-2 has crashed during processing of a complex transaction. As shown in FIG. 6, Application Server Transaction Manager 102-4 takes over the transaction logs of the crashed Application Server Transaction Manager 102-2 process and notifies any superior Application Server Transaction Manager nodes, such as Application Server Transaction Manager 102-1 and Application Server Transaction Manager 102-3, in order for these superior nodes to update their logs to point to the new server, Application Server Transaction Manager 102-

2. Bottom-up recovery modeled participants such as OTS or WTS 112 can query 602 against any other live node in the cluster to determine and drive the outcome. Also, OC4J will drive the recovery top-down if appropriate. Each Application Server Transaction Manager 102-1 to 102-4 logs 204 the transactions it has processed in the shared storage location for transaction logging 114.

Figure 7:
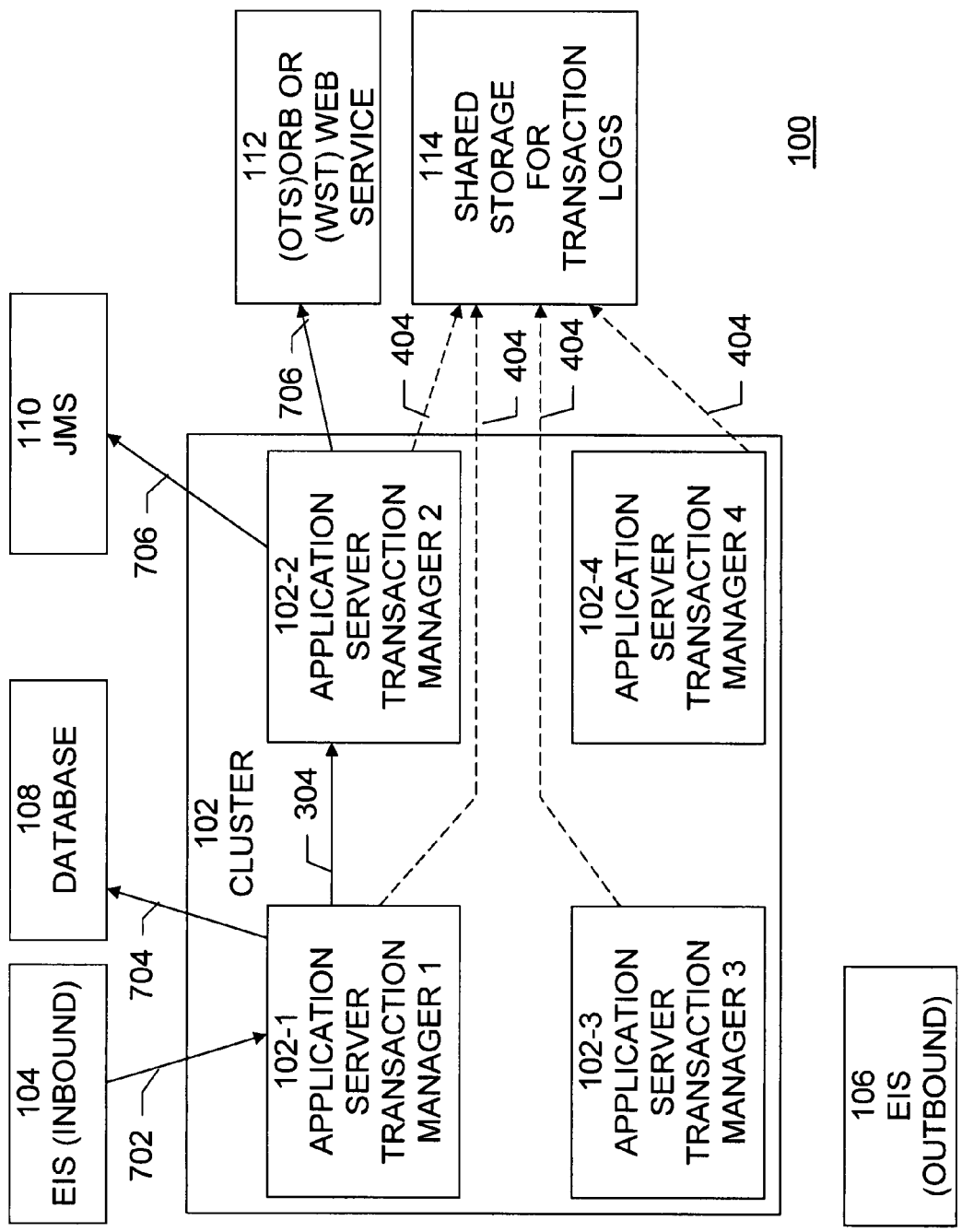
FIG. 7 illustrates an example of processing of a complex transaction in the system shown in FIG. 1.
Figure 8:
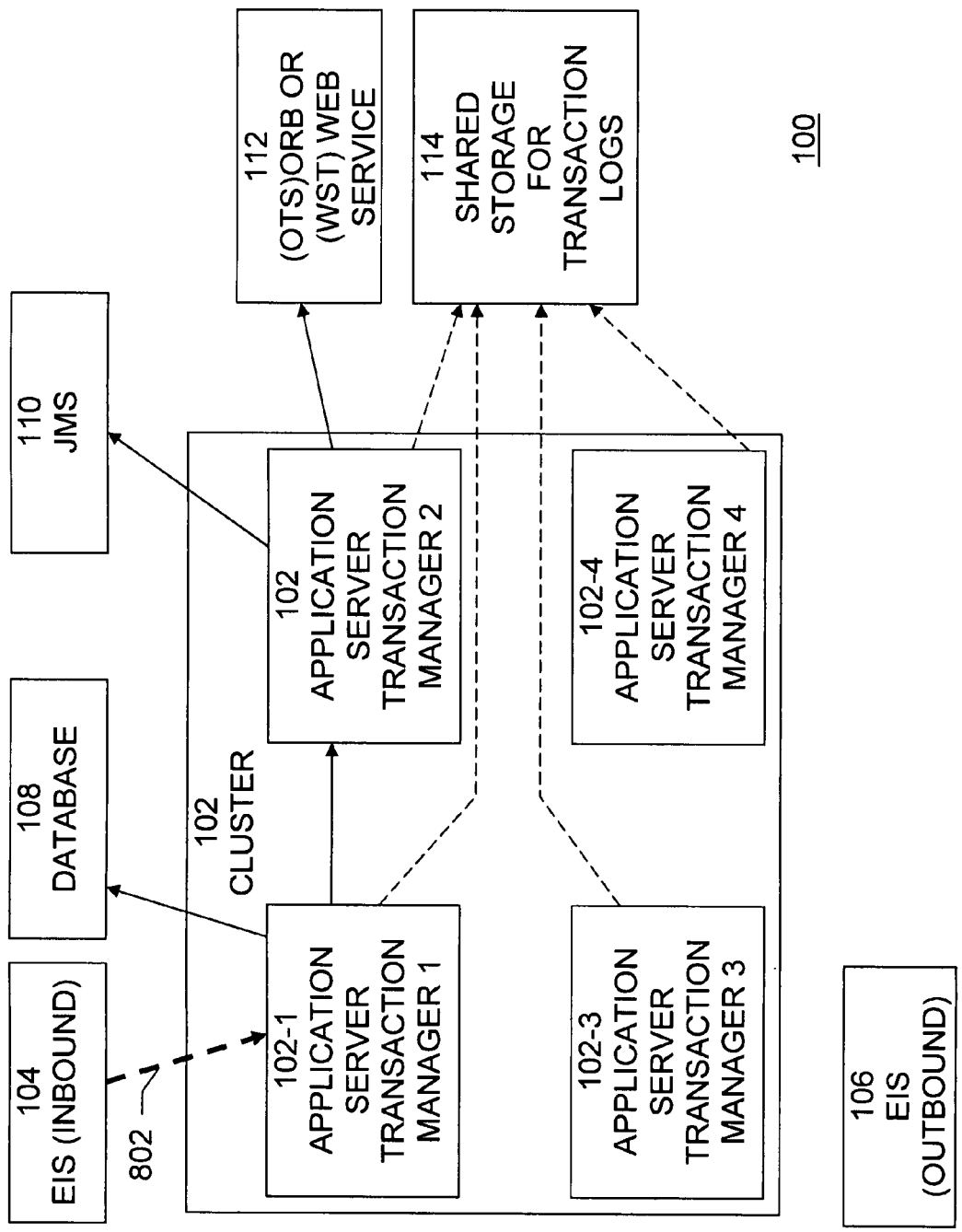
FIG. 8 illustrates an example of processing in which network communications crash have crashed in the system shown in FIG. 1.
Figure 9:
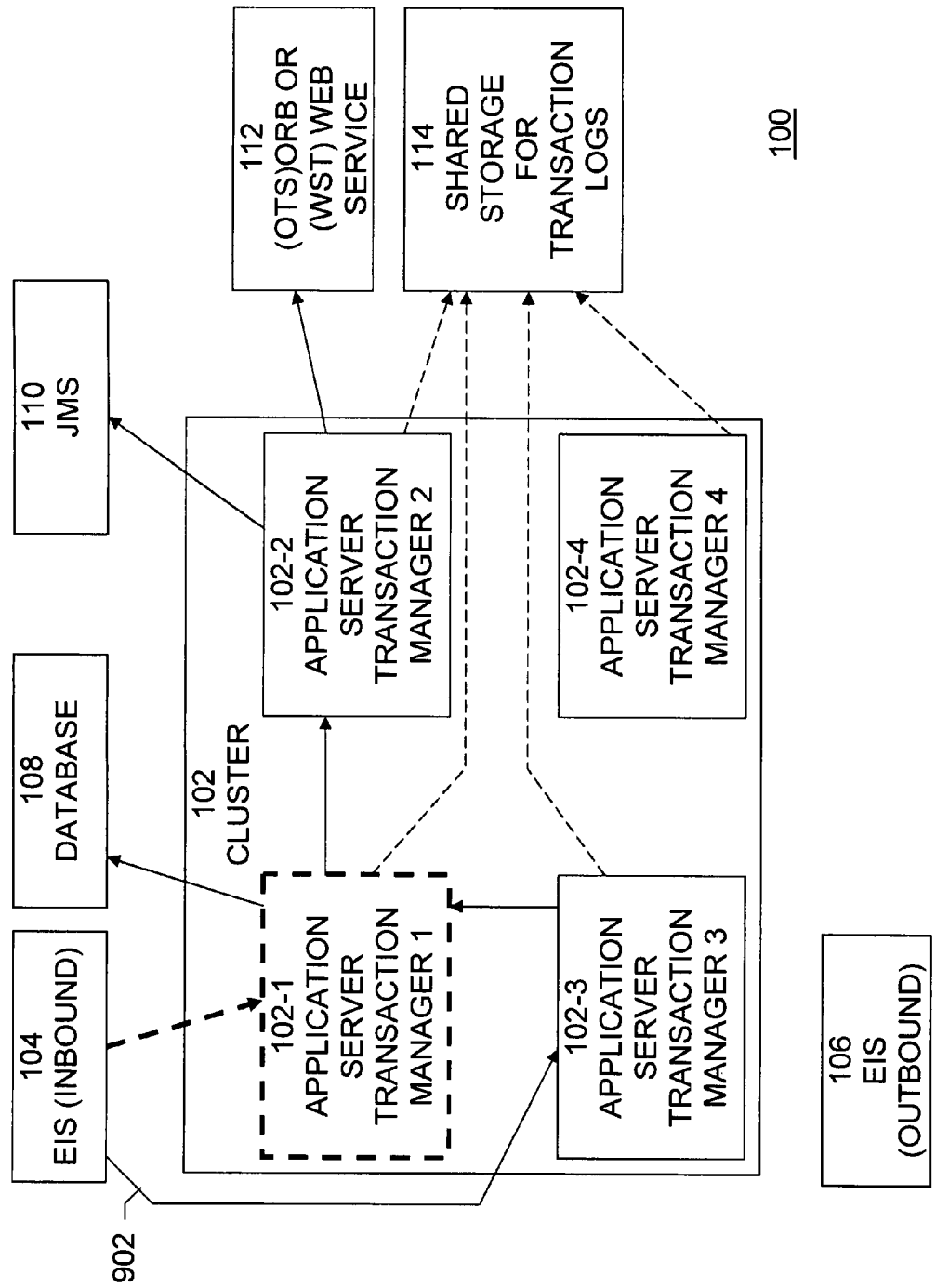
FIG. 9 illustrates an example of processing in which an Application Server Transaction Manager has crashed in the system shown in FIG. 1.

Examples of JCA inflow recovery are shown in FIGS. 7-9. An example of processing of a complex transaction is shown in FIG. 7. Complex transaction initiated within EIS enlists 702 Application Server Transaction Manager 102-1 via the JCA transaction inflow contract. Application Server Transaction Manager 102-1 in turn enlists 704 a number of different resources, such as database 108 and Application Server Transaction Manager 102-2, and spans multiple Application Server Transaction Managers. The call flow and therefore enlistment may occur in a number of combinations and there may be repeated calls between all nodes and resources within the context of the same transaction. For example, Application Server Transaction Manager 102-2 may enlist 706 JMS 110 and OTS or WTS 112. Each Application Server Transaction Manager 102-1 to 102-4 logs 204 the transactions it has processed in the shared storage location for transaction logging 114.

A more complex example of processing in which network communications crash is shown in FIG. 8. In this example, network communications 802 between inbound EIS transactions 104 and Application Server Transaction Manager 102-1 crash. In this case, Application Server Transaction Manager 102-1 is both a subordinate (to EIS inbound transactions 104) and a superior (to Application Server Transaction Manager 102-2).

An example of High Availability recovery processing in which an Application Server Transaction Manager crashes is shown in FIG. 9. In this example, Application Server Transaction Manager 102-1 crashes. In this case Application Server Transaction Manager 102-1 is both a subordinate (to EIS inbound transactions 104) and a superior (to Application Server Transaction Manager 102-2). EIS inbound transactions 104 attempts recovery 902 on a different Application Server Transaction Manager, Application Server Transaction Manager 102-3.

Figure 10:
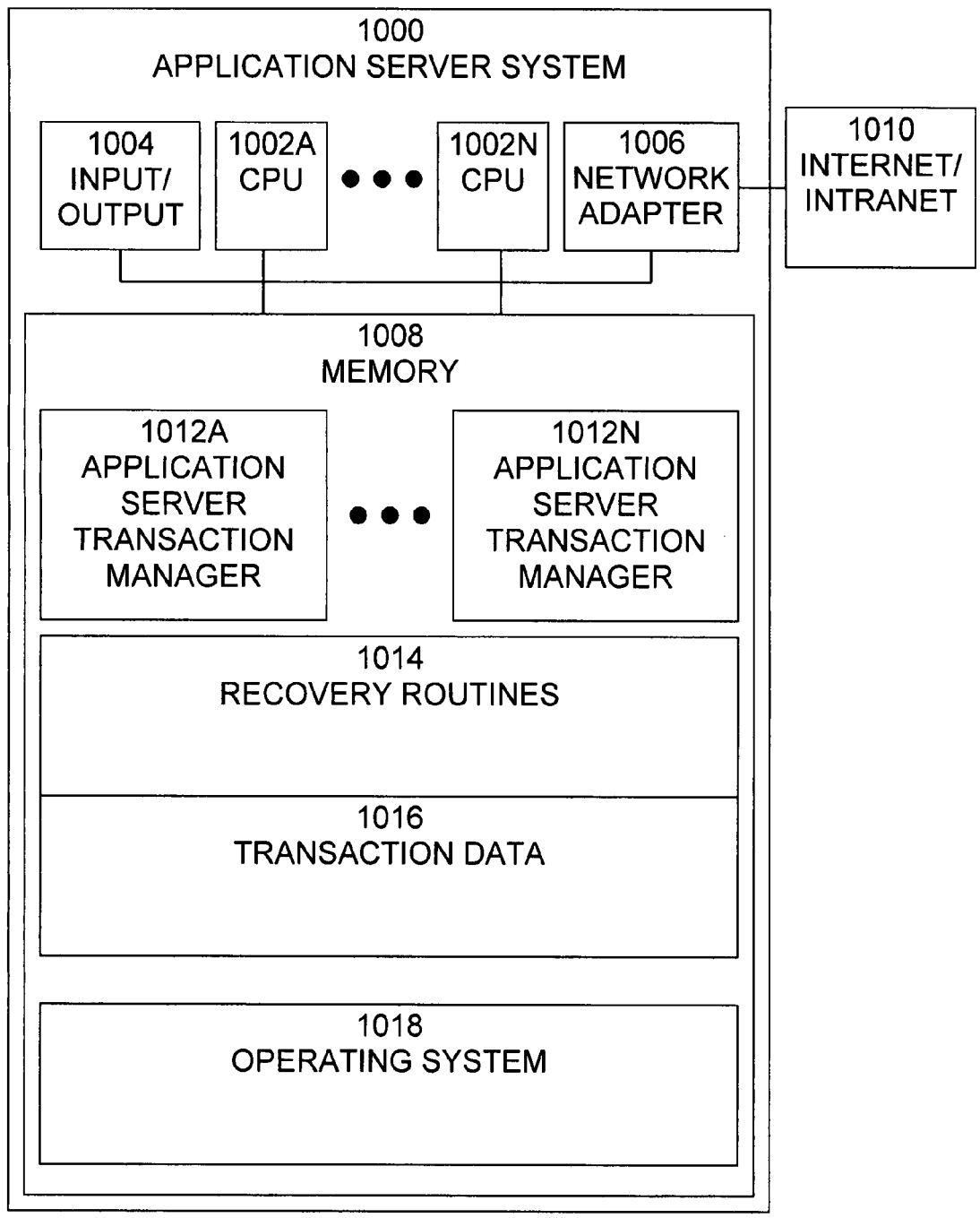
FIG. 10 is an exemplary block diagram of a system in which the present invention may be implemented.

An exemplary block diagram of a application server system 1000 in which the present invention may be implemented, is shown in FIG. 10. System 1000 is typically a programmed general-purpose computer system, such as a personal computer, workstation, server system, and minicomputer or mainframe computer. System 1000 includes one or more processors (CPUs) 1002A-1002N, input/output circuitry 1004, network adapter 1006, and memory 1008. CPUs 1002A-1002N execute program instructions in order to carry out the functions of the present invention. Typically, CPUs 1002A-1002N are one or more microprocessors, such as an INTEL PENTIUM® processor. FIG. 10 illustrates an embodiment in which DBMS 1000 is implemented as a single multi-processor computer system, in which multiple processors 1002A-1002N share system resources, such as memory 1008, input/output circuitry 1004, and network adapter 1006. However, the present invention also contemplates embodiments in which DBMS 1000 is implemented as a plurality of networked computer systems, which may be single-processor computer systems, multi-processor computer systems, or a mix thereof.

Input/output circuitry 1004 provides the capability to input data to, or output data from, database/DBMS 1000. For example, input/output circuitry may include input devices, such as keyboards, mice, touchpads, trackballs, scanners, etc., output devices, such as video adapters, monitors, printers, etc., and input/output devices, such as, modems, etc. Network adapter 1006 interfaces system 1000 with Internet/intranet 1010. Internet/intranet 1010 may include one or more standard local area network (LAN) or wide area network (WAN), such as Ethernet, Token Ring, the Internet, or a private or proprietary LAN/WAN.

Memory 1008 stores program instructions that are executed by, and data that are used and processed by, CPU 1002 to perform the functions of system 1000. Memory 1008 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 1008 varies depending upon the functions that system 1000 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 10, memory 1008 includes application server transaction managers 1012A-N, recovery routines 1014, transaction data 1016, and operating system 1018. Application server transaction managers 1012A-N manage the transaction processing, which is designed to maintain resources such as a database in a known, consistent state, by ensuring that any operations carried out on the database that are interdependent are either all completed successfully or all cancelled successfully. Recovery routines 1014 are software routines that perform recovery of transactions when transaction managers, or other nodes, fail during transaction processing. Transaction data 1016 is data relating to transactions that are being performed, which is typically used by one or more transaction managers 1012A-N to perform transaction processing. Transaction data 1016 also includes data that may be used by recovery routines 1014 to recover transactions when transaction managers, or other nodes, fail during transaction processing. Operating system 1018 provides overall system functionality.

As shown in FIG. 10, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The present invention further contemplates implementation in the form of computer program instructions, recorded on a computer readable storage medium, and executable by a processor, for performing processing.

What is claimed is:

1. A method of managing transaction processing comprising:
    performing transaction processing using a first process, wherein the first process logs the transaction processing that it performs;
    detecting failure of the first process, wherein the transaction logs of the first process are locked by the first process;
    taking ownership of the transaction logs of the first process at a second process, which is a peer process of the first process, and, at the second process, unlocking the locked transaction logs of the first process and recovering at least one transaction using the transaction logs; and
    updating a parent process of the first process to use the second process instead of the first process; wherein
    the parent process was the source of the transaction for which the first process performed transaction processing.

2. The method of claim 1, wherein the transaction is processed using a two-phase commit protocol.

3. The method of claim 2, wherein the first process and the second process are transaction managers.

4. The method of claim 1, further comprising:
    taking ownership of other locked resources of the first process at the second process;
    unlocking the other locked resources of the first process for use by the second process; and
    recovering at least one transaction using the other resources.

5. The method of claim 1, further comprising:
    logging the transaction processing in a common database with other processes in a cluster; wherein
    any other process in the cluster may query the database for the transaction ID of the failed first process such that the other process must not contact any of the remaining processes to recover a transaction.

6. A system for managing transaction processing comprising:
    a processor operable to execute computer program instructions;
    a memory operable to store computer program instructions executable by the processor; and computer program instructions stored in the memory and executable to perform the steps of:

performing transaction processing using a first process, wherein the first process logs the transaction processing that it performs;

detecting failure of the first process, wherein the transaction logs of the first process are locked by the first process;

taking ownership of the transaction logs of the first process at a second process, which is a peer process of the first process, and, at the second process, unlocking the locked transaction logs of the first process and recovering at least one transaction using the transaction logs; and updating a parent process of the first process to use the second process instead of the first process; wherein the parent process was the source of the transaction for which the first process performed transaction processing.

7. The system of claim 6, wherein the transaction is processed using a two-phase commit protocol.

8. The system of claim 7, wherein the first process and the second process are transaction managers.

9. The system of claim 6, further comprising:

taking ownership of other locked resources of the first process at the second process;

unlocking the other locked resources of the first process for use by the second process; and recovering at least one transaction using the other resources.

10. A computer program product for managing transaction processing comprising:

a non-transitory computer readable storage medium;

computer program instructions, recorded on the non-transitory computer readable storage medium, executable by a processor, for performing the steps of performing transaction processing using a first process, wherein the first process logs the transaction processing that it performs;

detecting failure of the first process, wherein the transaction logs of the first process are locked by the first process;

taking ownership of the transaction logs of the first process at a second process, which is a peer process of the first process, and, at the second process, unlocking the locked transaction logs of the first process and recovering at least one transaction using the transaction logs; and updating a parent process of the first process to use the second process instead of the first process; wherein the parent process was the source of the transaction for which the first process performed transaction processing.

11. The computer program product of claim 10, wherein the transaction is processed using a two-phase commit protocol.

12. The computer program product of claim 11, wherein the first process and the second process are transaction managers.

13. The computer program product of claim 10, further comprising:

taking ownership of other locked resources of the first process at the second process;

unlocking the other locked resources of the first process for use by the second process; and recovering at least one transaction using the other resources.

\* \* \* \* \*